(12) United States Patent
Kemnade

(10) Patent No.: US 6,986,292 B2
(45) Date of Patent: Jan. 17, 2006

(54) METHOD FOR DETERMINING THE POWER OF A TEST SPECIMEN AND POWER TEST BENCH FOR THE TEST SPECIMEN

(75) Inventor: H.-Jürgen Kemnade, Dorsten (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/873,402

(22) Filed: Jun. 21, 2004

(65) Prior Publication Data

US 2005/0016295 A1   Jan. 27, 2005

Related U.S. Application Data

(63) Continuation of application No. PCT/EP02/13823, filed on Dec. 6, 2002.

(30) Foreign Application Priority Data

Dec. 20, 2001 (DE) ................... 101 62 786
Dec. 20, 2001 (DE) ................... 101 62 787

(51) Int. Cl.
   *G01L 3/02* (2006.01)
(52) U.S. Cl. ................................. 73/862.191
(58) Field of Classification Search .......... 73/116, 73/117.2, 117.3, 862, 862.08, 862.191
   See application file for complete search history.

(56) References Cited

U.S. PATENT DOCUMENTS

| | | | |
|---|---|---|---|
| 3,942,363 A | | 3/1976 | Swis et al. |
| 4,457,182 A | | 7/1984 | McFarland |
| 4,841,218 A | * | 6/1989 | Rosinnes et al. ............. 322/24 |
| 4,870,585 A | * | 9/1989 | Manzolini ................... 701/101 |
| 5,182,512 A | * | 1/1993 | Braun et al. ................ 324/175 |
| 5,396,427 A | * | 3/1995 | Piehl et al. ................. 701/102 |
| 6,275,765 B1 | * | 8/2001 | Divljakovic et al. ........ 701/102 |

FOREIGN PATENT DOCUMENTS

| | | |
|---|---|---|
| DE | 30 34 943 A1 | 4/1982 |
| DE | 31 25 671 A1 | 1/1983 |
| DE | 41 38 446 A1 | 5/1993 |
| DE | 42 06 592 A1 | 9/1993 |
| DE | 44 40 974 C1 | 6/1996 |
| DE | 195 25 215 A1 | 1/1997 |
| DE | 197 31 647 A1 | 1/1999 |
| DE | 100 63 386 A1 | 6/2002 |
| JP | 56064638 | 6/1981 |

* cited by examiner

*Primary Examiner*—Max Noori
(74) *Attorney, Agent, or Firm*—Laurence A. Greenberg; Werner H. Stemer; Ralph E. Locher

(57) ABSTRACT

A method for determining the power of a test specimen, in particular of an internal combustion engine, includes registering a time profile of the rotational speed and of the torque characteristic of an output shaft of the test specimen with a measuring device. To determine the power at a specific time, the time profile of the rotational speed and of the torque characteristic is exclusively measured. The test specimen is tested within a time period during which there is no necessity for forced cooling. A test bench for carrying out the method is also provided.

24 Claims, 2 Drawing Sheets

METHOD FOR DETERMINING THE POWER OF A TEST SPECIMEN AND POWER TEST BENCH FOR THE TEST SPECIMEN

CROSS-REFERENCE TO RELATED APPLICATION

This application is a continuation, under 35 U.S.C. § 120, of copending international application No. PCT/EP02/13823, filed Dec. 6, 2002, which designated the United States; this application also claims the priority, under 35 U.S.C. § 119, of German patent application No. 101 62 787.4, filed Dec. 20, 2001; the prior applications are herewith incorporated by reference in their entirety.

BACKGROUND OF THE INVENTION

Field of the Invention

The invention relates to a method for determining the power of a test specimen, for example, of an internal combustion engine, using a power test bench. In addition, the invention relates to a measuring device for measuring the power of the test specimen with at least one measured value pickup and with an evaluation device that interacts with the at least one measured value pickup. The invention also relates to a power test bench for the test specimen with the measuring device, with a rack in which the test specimen can be secured in a test position, with a starter for the test specimen, which starter is connected to the test specimen with a coupling and measuring device, and with a data processing system for controlling a power-measuring test.

Previous, generally known methods for determining the power of a test specimen require complex test preparation in which the test specimen is connected to the test device and its power is, normally, determined under real loading conditions.

The real loading conditions are, frequently, brought about here by a brake motor or a brake that simulates the load, the brake motor or the brake usually acting on the output shaft of the test specimen and, additionally, having to have the same power output and capability as the test specimen to be able to test the test specimen. Here, in particular, electric motors are configured as brake motors and their power drain is used to determine the power of the test specimen. Both electric motors and eddy current brakes are known as such brake drives.

If, for example, an internal combustion engine of a motor vehicle is to be tested, initially, this requires considerable equipping time to be able to make it ready for testing as a test specimen. The equipping, including, for example, the connection of the media supply systems to the test specimen, such as control lines, propellant supply, and coolant feed. Afterwards, the testing of the load itself takes a comparatively long time, typically approximately 20 to 30 minutes for the engine of a motor vehicle, to obtain the necessary power values. This constitutes a considerable degree of expenditure.

Mainly all internal combustion engines that output power are possible as test specimens, that is to say, for example, internal combustion piston engines of motor vehicles or turbines. Machines that have a drive power of at least 20 kW are to be referred to here as test specimens.

SUMMARY OF THE INVENTION

It is accordingly an object of the invention to provide a method for determining the power of a test specimen and power test bench for the test specimen that overcome the hereinafore-mentioned disadvantages of the heretofore-known devices and methods of this general type and that that shorten the test time and in addition reduce the measuring expenditure.

With the foregoing and other objects in view, there is provided, in accordance with the invention, a method for determining a power of a test specimen having an output shaft, including the steps of registering a time profile of a rotational speed and of a torque characteristic of the output shaft of the test specimen with a measuring device, exclusively measuring the time profile of the rotational speed and of the torque with the measuring device to determine the power of the test specimen (26) at a specific time, and testing the test specimen within a time period during which there is no necessity for forced cooling of the test specimen.

With the objects of the invention in view, there is also provided a method for determining a power of an internal combustion engine having an output shaft, including the steps of registering a time profile of a rotational speed and of a torque characteristic of the output shaft of the internal combustion engine with a measuring device, exclusively measuring the time profile of the rotational speed and of the torque with the measuring device to determine the power of the internal combustion engine at a specific time, and testing the internal combustion engine within a time period during which there is no necessity for forced cooling of the internal combustion engine.

Accordingly, the method according to the invention requires, for determining the power of a test specimen, a measuring device for registering the time profile of the rotational speed and of the torque characteristic of an output shaft of the test specimen, only the time profile of the rotational speed and of the torque being measured to determine the power at a specific time, and the test specimen being tested within a time period during which there is no necessity for forced cooling, that is to say, the waste heat that is produced during operation is mainly absorbed by the test specimen based upon its heat capacity and is partially output again to the environment by radiated and convected heat.

An important advantage of the method according to the invention for determining the power of the test specimen is that only the rotational speed and the torque are measured in conjunction with time as measured variables. As a result, the expenditure on instrumentation and measurement is considerably reduced in comparison to the previously known methods.

On one hand, the time period within which the testing is carried out is, advantageously, short. The testing of the power is, specifically, carried out in such a short time that the heat loss produced as a result of the combustion is overwhelmingly absorbed by the test specimen without, however, overheating occurring unacceptably. That is to say, that during the testing of the power no operating states are reached that allow the test specimen to experience extreme wear or even damage. Mainly, the heat capacity of the test specimen is used to absorb the waste heat. Accordingly, it is also no longer necessary to connect a device for forced cooling to the test specimen for the duration of the measurement of the power. Overall, according to the invention, the testing time of a typical piston internal combustion engine of a motor vehicle can be shorted to approximately 1 minute.

In one advantageous development of the method according to the invention, the power of the test specimen is calculated at the specific time by the formula:

$$P(t)=M[Nm]n(t)/9550,$$

where:

P(t) is the power P of the test specimen at the specific time (t);

M(t) is the torque at the specific time (t);

n(t) is the rotational speed at the specific time (t); and the constant 9550, as the denominator of the formula, corresponds to the generally known constant for determining the power from a torque measurement.

It can be seen from the formula that the power is now only dependent on the rotational speed and the torque and, as a consequence, is advantageously simple, the rotational speed already, inherently, being a time-dependent variable.

In accordance with another mode of the invention, the test specimen is tested in a test bench that is set up for this type of power testing. The test bench is adapted in an optimum way to the test conditions and, in this way, provides sufficiently good test conditions.

In accordance with a further mode of the invention, the test specimen is, first, driven by a starter until a predefined rotational speed that is specific to the test specimen is reached. In the case of internal combustion engines, the idling rotational speeds, typically, rotational speeds between 400 and 1,400 revolutions per minute (rpm), are frequently the rotational speeds that are predefined for this method step. The engine is, then, under particularly favorable starting conditions. In the case of turbines, the typical predefined rotational speeds can be significantly higher, for example, 3,000 rpm and higher.

In accordance with an added mode of the invention, the test specimen is switched on when a previously defined rotational speed for automatic operation is reached. If particularly favorable starting conditions are to prevail, the predefined rotational speed is the predefinable rotational speed. However, in principle, a minimum rotational speed is sufficient as the defined rotational speed at which the test specimen can just still be started. The advantage here is that a starter that is required to reach the defined rotational speed can be made particularly small.

In accordance with an additional mode of the invention, after the specific rotational speed is reached or if the test specimen is running in the automatic mode, the starter is switched off. This means the test specimen outputs power and, accordingly, already drives its output shaft automatically if the starter is switched off. This avoids the measurement of the power being influenced by a further active drive or brake drive. This is a particular advantage of the invention with this type of power measurement according to the invention. Accordingly, in particular, the rotor of the starter turns, as already explained, without an independent drive but is also driven by the test specimen.

However, the starter can also be decoupled from the test specimen. The test specimen can, then, advantageously be accelerated quickly or rotational-speed accelerated.

In accordance with yet another mode of the invention, the test specimen is accelerated up to a maximum rated rotational speed when operating under its own power. This provides a comparatively short test time.

The test time is shortened further if the acceleration is carried out with the predefinition of a full load value for the rotational speed. The test time is, then, advantageously minimized.

In accordance with yet a further mode of the invention, a number of power levels of the test specimen are determined at defined rotational speed values, the power points between the measured rotational speeds are connected by an interpolation method, in particular, a linear one, and the power curve that is so determined is stored as a function of a rotational speed and, if appropriate, the measured values. The objective of the power determination is frequently, in addition to a power point, for example, the maximum power or an individual power at the predetermined operating point, to obtain a power curve, for example, because the power characteristic of a car engine is to be determined. This is advantageously achieved by the method steps described above.

In accordance with yet an added mode of the invention, a test bench set up for power testing is provided and the test specimen is tested in the test bench.

In accordance with yet an additional mode of the invention, the test specimen is placed in a test position in the test bench where the power testing is to be carried out.

In accordance with again another mode of the invention, the test specimen is permanently connected to the test bench in the test position.

In accordance with again a further mode of the invention, the test specimen is removably fixedly connected to the test bench in the test position.

In accordance with again an added mode of the invention, a starter for starting the test specimen is provided and the starter is coupled to the output shaft of the test specimen with a coupling device.

In accordance with again an additional mode of the invention, the starter is coupled to the output shaft of the test specimen by interposing a measuring and coupling device.

In accordance with still another mode of the invention, a fuel supply device is connected to the test specimen.

In accordance with still a further mode of the invention, the test specimen has a control system and control and data lines for actuating the test specimen are connected to the control system.

In accordance with still an added mode of the invention, the test specimen has an exhaust gas system, an exhaust gas discharge line device is connected to the exhaust gas system of the test specimen, and any exhaust gases produced during a test from a region of the test bench are carried away with the exhaust gas discharge line device.

In accordance with still an additional mode of the invention, the measured values to be picked up by an evaluation device and, if appropriate, represented graphically and made available for further data processing. Accordingly, the evaluation device represents both the measured data and the data evaluation in the form of stored results data or already as graphics. As such, the quality of the test specimen can be recognized by a first visual check. Likewise, it becomes possible to use the measured data and the results data to automate the checking as to whether or not the power testing was successful.

In accordance with another mode of the invention, a test sequence of the test specimen is controlled or regulated with a control device.

With the objects of the invention in view, there is also provided a power test bench for a test specimen, in particular, for an internal combustion engine, including a measuring device for measuring a time profile of a rotational speed and of a torque characteristic of the test specimen, a rack in which the test specimen is to be secured in a test position, a starter for starting the test specimen, the starter being at least temporarily connected to the test specimen, a data processing system for controlling a sequence of a power measurement test of the test specimen, and the measuring device, the rack, the starter, and the data processing system testing the test specimen within a time period during which there is no need for forced cooling of the test specimen.

With the objects of the invention in view, there is also provided a power test bench for a test specimen, in particular, for an internal combustion engine, including a measuring device for measuring a time profile of a rotational speed and of a torque characteristic of the test specimen, a rack in which the test specimen is to be secured in a test position, a starter for starting the test specimen, the starter being at least temporarily connected to the test specimen, a data processing system for controlling a sequence of a power measurement test of the test specimen, and the measuring device, the rack, the starter, and the data processing system not needing a device for forced cooling of the test specimen to test the test specimen.

A device for forced cooling of the test specimen, in particular, a device for feeding fluid coolant, is avoided, and the test specimen can be tested within a time period during which there is no need for forced cooling.

In accordance with a further feature of the invention, the method according to the invention can be implemented particularly favorably with a power test bench that is configured in this way. Accordingly, the power measurement can be carried out in a time period during which forced cooling is avoided. Forced cooling can be understood to be any method of feeding coolant, for example, a coolant circuit or a coolant blower or system. Such devices that are otherwise customary are completely absent from the subject matter of the invention and constitute an important advantage of the invention. The test time is, accordingly, advantageously shortened and, in addition, the expenditure on measuring is reduced as a result of the shortened test time and as a result of the rotational speed to be measured, torque measurement, or as a result of the measurement of time in the measuring expenditure.

In accordance with an added feature of the invention, the test specimen has an output shaft, the starter has a shaft, and a coupling and measuring device is disposed between the shaft of the starter and the output shaft of the test specimen.

In accordance with an additional feature of the invention, a table device is permanently connected to the rack and on which the starter is disposed. Such a configuration is better organized and, in particular, the starter is easily accessible. In addition, the table device provides a working plane to which reference can be made particularly favorably. For example, the measuring and coupling device can also be mounted particularly easily on the table device. In addition, the plane of the table can serve as measures for orienting the test specimen to prepare for the power measurement.

In accordance with yet another feature of the invention, the starter is configured only for driving the test specimen to a previously determined rotational speed, in particular, an idling rotational speed. As such, a particularly small, space-saving refinement of the starter is obtained. The function of the starter is, in contrast to the otherwise customary brake motors, already achieved by virtue of the fact that the starter accelerates the test specimen to a specific rotational speed. The rotational speed may already have been reached in an internal combustion engine if a starting rotational speed permits the engine to be started so that it runs automatically. However, there is the risk here of the engine not starting at the first attempt, for whatever reasons. Therefore, the starter can also in particular, be configured such that it drives the test specimen up to an idling rotational speed. Experience has shown that such a process ensures such good starting conditions that the test specimen generally already starts at the first start attempt.

In accordance with yet a further feature of the invention, the predetermined rotational speed is an idling rotational speed.

In accordance with yet an added feature of the invention, the coupling and measuring device is disposed on the table device.

In accordance with yet an additional feature of the invention, the coupling and measuring device is to be selectively coupled to or decoupled from the output shaft of the test specimen.

In accordance with again another feature of the invention, there is provided a fuel coupling device disposed at the rack and a fuel supply device, the fuel coupling device configured to connect the fuel supply device to a propellant system.

In accordance with again a further feature of the invention, the test specimen has an exhaust gas system, a sealing device is to be connected to the exhaust gas system of the test specimen, and the sealing device is configured to carry away exhaust gas of the test specimen.

In accordance with again an added feature of the invention, there are provided a conveying device conveying the test specimen to the rack and at least one screw device being disposed on the rack and selectively releasing the test specimen from the conveying device or securing the test specimen to the conveying device.

In accordance with again an additional feature of the invention, there is provided a lifting device disposed at the rack, the lifting device moving the test specimen into the test position at the rack from a conveying position on the conveying device or from the test position at the rack to a conveying position on the conveying device.

In accordance with still another feature of the invention, there is provided a retaining device disposed at the rack, the retaining device clamping the test specimen against at least one of the rack and the lifting device and securing the test specimen against shaking loose for a testing operation.

An important measure when measuring power is to secure the test specimen securely on or to the power test bench. In addition to the at least one securing device that is provided for such a purpose, in accordance with still a further feature of the invention, a retaining device is additionally disposed on the rack, by which device the test specimen can be clamped against the rack or the lifting device and can be secured against shaking loose for the test operation. This component advantageously improves the connection of the test specimen to the test bench. The risk of the test specimen shaking loose is, thus, lower. In addition, the oscillation excitation and vibrations caused by the test specimen are damped better.

The power test bench according to the invention is provided in one specific refinement with a data processing system that is configured to perform the evaluation of the measurement. In such a configuration, the functions of the evaluation device are integrated into the data processing system, that is to say, in this variant of the subject matter of the invention, the evaluation device can be favorably dispensed with.

In accordance with still an added feature of the invention, the test specimen has connecting and control lines and a connecting device removably connects at least one of the connecting and control lines of the test specimen to the data processing system.

In accordance with still an additional feature of the invention, there is provided an evaluation device connected to the data processing system.

In accordance with another feature of the invention, the data processing system is programmed to control and regulate the test sequence of the test specimen.

In accordance with a further feature of the invention, the test specimen has connecting and control lines and an exhaust gas system, a connecting device removably connects at least one of the connecting and control lines of the test specimen to the data processing system, at least one securing device is disposed at the rack, the securing device securing the test specimen in the test position, a sealing device is to be connected to the exhaust gas system of the test specimen, the sealing device is configured to carry away exhaust gas of the test specimen, and the data processing system is programmed to actuate and co-ordinate at least one of the at least one screw device, the lifting device, the retaining device, the connecting device, the at least one securing device, the sealing device.

In accordance with a concomitant feature of the invention, the data processing system is connected to the measuring device and is programmed to perform an evaluation of the measurement.

Other features that are considered as characteristic for the invention are set forth in the appended claims.

Although the invention is illustrated and described herein as embodied in a method for determining the power of a test specimen and power test bench for the test specimen, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
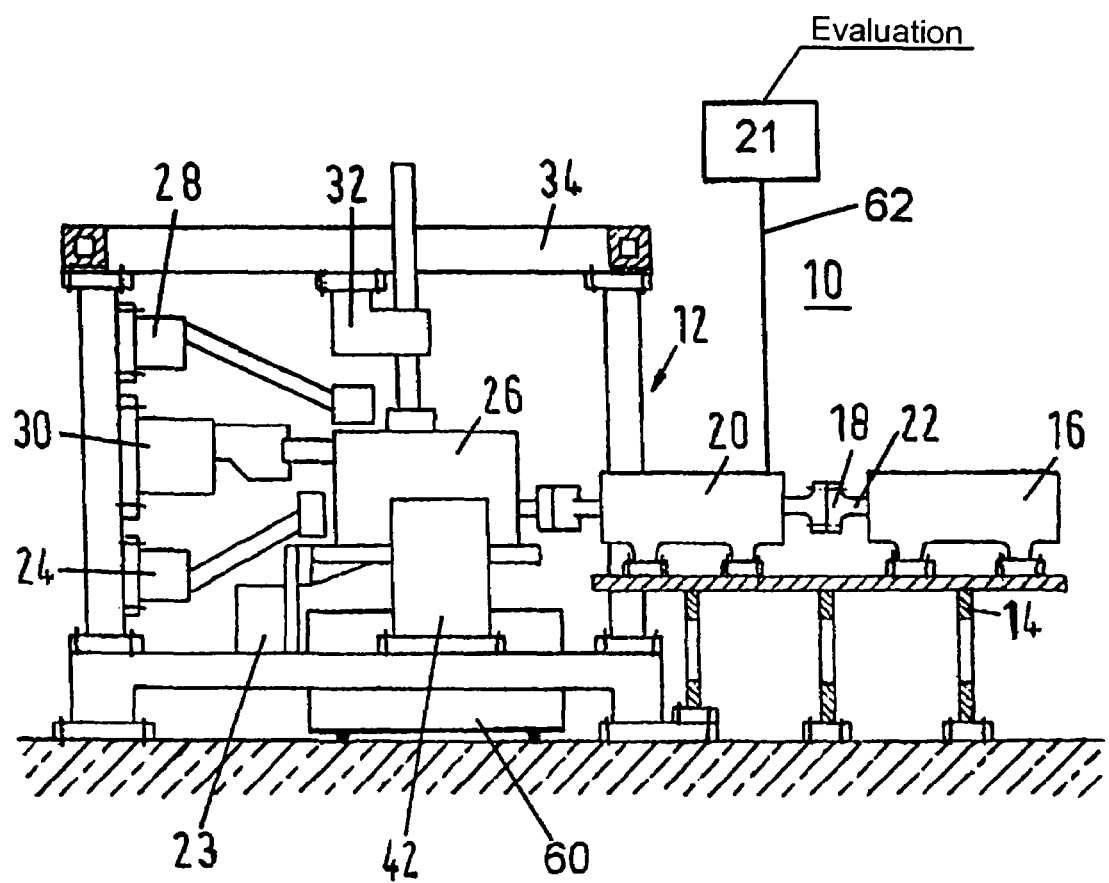
FIG. 1 is a fragmentary cross-sectional view of a power test bench according to the invention.

Referring now to the figures of the drawings in detail and first, particularly to FIG. 1 thereof, there is shown a cross-sectional view of a power test bench 10. A rack 12 on which a table device 14 is disposed serves as the basis of the power test bench.

A starter device 16, to which a coupling and test device 20 is connected by a coupling 18, is disposed on the table device 14. The coupling 18 is rigid in this embodiment so that the starter device 16 and the coupling and test device 20 form a starter unit in the coupled state.

The coupling and test device 20 can be connected to a test specimen 26. The connection takes place without attenuation. As such, in the testing mode, the power level, in particular, the power characteristic, is transmitted as directly as possible from the test specimen 26 to the coupling and test device 20.

In this example, the test specimen 26 is a 4-cylinder, 4-stroke, in-line engine. However, any other power-outputting internal combustion engine, for example, 2-stroke engines, diesel engines and turbines, are also possible as the test specimen 26.

The coupling and test device 20 has, in this example, an incremental signal transmitter with 2,500 increments per 360 degrees, a signal conditioning device, and a measured-value acquisition device with a data-acquisition rate of at least 200 kHz. All the signal pickups that acquire the measured values that are to be fed into the starter and test device 20 through a shaft 22 and picked up are mounted on the starter and test device 20. In the illustrative example, the evaluation device 21 is a data processing system in the form of a personal computer (PC) connected to the starter and test device 20 through a signal line 23. The evaluation device 21 performs the evaluation of the measured data received from the power test bench 10, referred to as test bench 10 for short.

In the exemplary embodiment, the in-line engine 26 can be lifted out from a conveyor system (not illustrated in the figure) using a lifting device 23, and is placed in the test position on the test bench. An individual conveyor system, today usually driverless, is possible, for example, as the conveyor system. However, it is readily possible to use any continuous or discontinuous conveying system that is suitable for the in-line engine 26 or the test specimen 26. The test bench 10 according to the invention can easily be structurally adapted to the respective conditions.

Furthermore, two screw devices 24 (of which only one is shown in the figure) are moveably disposed on the rack 12, and they release the in-line engine 26 that is mounted on the conveyor device. The lifting device 23 moves the in-line engine 26 into a test position in a first securing device 42 and a second securing device 50 to secure the in-line engine in the test position by displacing these securing devices towards one another from two sides in a horizontal plane. The in-line engine 26 that is located between the securing devices 42, 50 is, in this way, clamped and secured. Of the securing devices 42, 50 only the first securing device 42 is shown in FIG. 1. However, the method of operation of both securing devices 42, 50 can be seen in FIG. 2.

A multi-coupling device 28 is provided for connecting a non-illustrated fuel supply line to a fuel system of the in-line engine 26 and for connecting electrical supply lines, control lines and signal lines to the corresponding lines of the in-line engine 26. The multi-coupling device 28 can also be moved in three spatial directions to be able to connect to the corresponding coupling point on the in-line engine 26.

A sealing device 30 can be connected in a tightly sealed fashion to an exhaust gas system of the in-line engine 26, exhaust gases of the in-line engine 26 that are produced during operation being carried out from the test bench 10 through a non-illustrated exhaust gas line. To fulfill this function, the sealing device 30 can move in the three spatial directions, in a way comparable to the multi-coupling device 28.

A retaining device 32 is moveably disposed on an upper transverse member 34 of the rack 12, the retaining device 32 being provided for the purpose of additionally securing the in-line engine 26, in particular, during testing. The retaining device 32 is moved vertically onto the in-line engine 26 from above and the predefined force is applied to it, that is to say, it is clamped.

An advantageous method sequence is described in more detail below with reference to the exemplary embodiment of the inventive power test bench according to FIG. 1.

Using the conveyor device, the in-line engine 26 is conveyed to the test bench 10 and placed in an unloading position, provided for that purpose, in the region of the rack 12. Using the two screw devices 24 opposite one another, the in-line engine 26 is, first, released from a conveying mount. The lifting device 23 is located underneath the unloading position and is, then, substantially moved upwards and, in the process, lifts the in-line engine 26 out of the conveying device and into a test position. In this example, the conveying device remains in the unloading position in the test bench 10. However, it is also conceivable for the latter to be moved into a park position outside the test bench region.

Using the securing devices 42, 50, the in-line engine 26 is clamped tightly in the test position, that is to say, the securing devices 42, 50 apply a previously defined force to the in-line engine 26 in a horizontal direction. In addition, the lifting device 23 prevents the in-line engine 26 from being able to be moved downwards.

The test specimen 26 or the in-line engine 26 is, then, securely connected to the test bench 10 or clamped against its rack 12. The retaining device 32 is moved from above towards the in-line engine 26 into a predefined position, and the in-line engine 26 is, thus, clamped against the test bench 10 or the lifting device 23. As such, the in-line engine 26 is additionally secured, the in-line engine 26 being, accordingly, then secured at two points in the horizontal direction, and at two further points in the vertical direction from above and below.

The multi-coupling device 28 is connected to the counter-coupling provided for that purpose or to a corresponding point on the in-line engine 26. In a further method step, the sealing device 30 is connected to the exhaust gas system of the in-line engine 26.

Here, the sequence of the steps to be carried out is not necessarily fixed as in the aforesaid example. There are a number of different expedient sequences with which it is also possible for various steps to be carried out in parallel. For example, in this example the sealing device 30 can be connected simultaneously with the connection of the multi-coupling device 28 (or in reverse order) if the movement sequences of the device do not interfere with one another.

In the example, the sequences on the test bench 10 and the testing of power are controlled and measured using a measuring and control device that is not shown in the figure, but is connected to the various devices of the test bench 10 by corresponding control and signal cables. After the in-line engine 26 has been secured in its test position, the method for determining the power can begin.

For such a purpose, the in-line engine 26 is, first, accelerated to an idling rotational speed of approximately 850 revolutions per minute (rpm) using the starter device 16 that is coupled through the coupling and test device 20. Motor vehicle engines usually have idling rotational speeds of approximately 450 to 1,000 rpm.

In principle, there are, then, two possible ways according to the invention of continuing the power test. Either the starter device 16 is automatically decoupled from the measuring and coupling device 20 or simply only switched off, and turns as a coupled mass with the output shaft of the in-line engine 26. Regardless of the procedure adopted with the starter device 16, the in-line engine 26 is started by the measuring and control device and operated under its own power.

However, in both cases it is advantageous that the starter device 16 only needs to be configured for a comparatively low power. The starter device 16 must specifically only accelerate the in-line engine 26 to the idling rotational speed and is, then, no longer actively involved, that is to say, for example, as a brake, in the determination of the power. The otherwise customary drives with the same power level as the test specimen are, advantageously, avoided.

In both cases, the measuring process for determining the power can start by accelerating the in-line engine 26 with full-load predefinition when it is running under its own power to its maximum rated rotational speed. This process is, then, repeated 4 times. During the entire test time, the time profile of the rotational speed and of the torque of the output shaft of the in-line engine 26 is acquired by the measuring and control device. In this example, acceleration from the idling rotational speed to the maximum rated rotational speed takes 12 seconds. With the repetitions, the entire testing of power takes only 90 seconds. This is the time period for which the in-line engine 26 can be operated without any external cooling, that is to say, without cooling water.

It has become apparent that the motor vehicle engines that are customary today, in particular, the diesel and gasoline reciprocating piston engines already produce very good power measured values with three repetitions within a measuring time of one minute in total. More frequent repetitions correspondingly increase the statistical informativeness of the measurement, but such an increase is achieved at the cost of the testing time, which ultimately determines the number of tests per time unit.

The comparatively short test time is also achieved by virtue of the fact that the in-line engine 26 is, as hitherto customary in the prior art, loaded by a load that corresponds to the engine's own power, for example, an eddy current brake, in order to obtain the power curve, but, instead, only the rotary masses connected to the output shaft are accelerated, that is to say, accelerated to the maximum rotational speed to carry out the measurement of power.

Using the measured time profiles of the rotational speed and of the torque, first, the power is calculated for a number of defined rotational speeds using the formula $$P(t)=M(t)*n(t)/9550,$$

for example, for any rotational speed between the idling rotational speed and the maximum rated rotational speed in increments of 100 rpm. The power P(t) is, then, determined at each of the rotational speed points by multiplying the torque measured at a rotational speed point by the rotational speed and, then, dividing the result by the constant 9550.

The measured values are used as the basis of the calculation. The calculation is better the more precise the determination of the time profile of the rotational speed. In the example described, an incremental transmitter with 2,500 increments per 360 degrees is, as already described at the beginning, installed in the measuring and coupling device 20. In addition, a well-known measuring configuration including strain gauges can be disposed on a rotary shaft of the measuring and coupling device 20 to register the torque characteristic. The measured data are registered with a measuring map that has a data-acquisition rate of more than 200 kHz. The measuring and control device is configured as a personal computer (PC) that both acquires the measured values and evaluates the measured data as well as controlling and adjusting the preparation for the test and post-processing of the test together with the co-ordination of the movements of the devices for connecting and releasing the in-line engine 26 after the measurement of power. With such a measuring device, measured values have been measured or engine powers calculated that only have a level of inaccuracy of +3% or −2%. In all cases, the customary requirements that are made of the measuring accuracy of +/−5% can readily be complied with.

To obtain a power curve from the calculated individual points, it is appropriate to use an interpolation method. If a sufficient number of measuring points and calculation points have been provided, a linear interpolation method is generally sufficient for obtaining adequate result curves. However, predetermined polynomials can also be used as the basis for interpolation.

Either the power plotted against the rotational speed, the power plotted over time, or the power plotted in rotational speed increments is represented graphically by the evaluation device as advantageous and informative results. Any other way of representing the measuring results, calculation results, or intermediate results is readily conceivable and can be implemented with the evaluation device.

After the end of the testing of power, the in-line engine 26 is switched off and can be released from the test bench 10, that is to say, the sealing device 30, the multi-coupling device 28, and the retaining device 32 are removed from the test bench. The retaining devices 24 move back into a starting position and, in this way, release the measures for securing the in-line engine 26. When all the connections to the devices of the test specimen 26 are released, the test specimen 26 is, then, supported by the lifting device 23, which moves the in-line engine away from the test position again and back onto the conveying device.

Using the screw devices 24, the in-line engine 26 is mounted on the conveying device again or its conveyance on the latter is secured so that further conveyance to a point at which the next production step is planned can take place.

Figure 2:
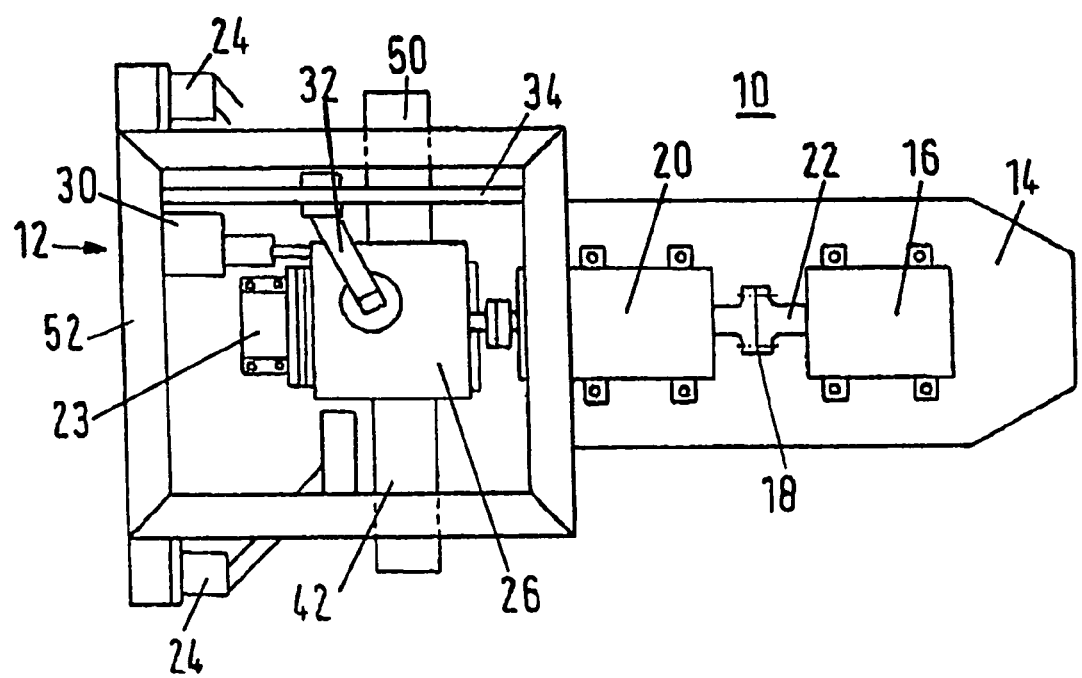
FIG. 2 is a plan view of the power test bench of FIG. 1.

FIG. 2 shows a plan view of the power test bench 10. Here, in this figure those components that have already been introduced in FIG. 1 and are also shown in FIG. 2 have been provided with the same reference symbols.

In particular, in this view, it is apparent that the rack 12 is embodied in a horizontal plane 52 in the manner of a frame. The screw connections 24 are disposed opposite one another on two sides of the frame. On a third side, the starter unit composed of the starter device 16, coupling 18, and measuring and coupling device 20 is disposed on the table device 14.

The in-line engine 26 is illustrated in its test position and has been placed in the test bench 10 through the fourth side. Such a preferred configuration of the various devices on the test bench 10 has the particular advantage that they can be disposed in a particularly well-organized and accessible way. Possible interference can, therefore, frequently already be recognized from a first visual check. In addition, the test bench 10 can easily be integrated into the production sequence because the latter is fully accessible from one side.

I claim:

1. A method for determining a power of a test specimen having an output shaft, which comprises:
   registering a time profile of a rotational speed and of a torque characteristic of the output shaft of the test specimen with a measuring device;
   exclusively measuring the time profile of the rotational speed and of the torque with the measuring device to determine the power of the test specimen at a specific time; and
   testing the test specimen within a time period during which there is no necessity for forced cooling of the test specimen.

2. The method according to claim 1, which further comprises calculating the power of the test specimen at the specific time according to the formula:

$$P(t)=M(t)[Nm]*n(t)/9550,$$

where:
   P(t)=power P at the specific time (t);
   M(t)=torque of the output shaft at the specific time (t); and
   n(t)=rotational speed at the specific time (t).

3. The method according to claim 1, which further comprises driving the test specimen with a starter until a predefined rotational speed specific to the test specimen is reached.

4. The method according to claim 1, which further comprises starting independent operation of the test specimen when the test specimen reaches a predefined rotational speed.

5. The method according to claim 3, which further comprises switching off the starter after one of:
   the predefined rotational speed is reached; and
   if the test specimen is running under its own power.

6. The method according to claim 5, which further comprises starting independent operation of the test specimen when the test specimen reaches the predefined rotational speed.

7. The method according to claim 6, which further comprises decoupling the starter from the test specimen.

8. The method according to claim 7, which further comprises accelerating the test specimen to a maximum rated rotational speed when the test specimen is running under its own power.

9. The method according to claim 8, which further comprises carrying out the acceleration with a predefinition of a full load value for the rotational speed.

10. The method according to claim 1, which further comprises:
   determining a number of power values of the test specimen at defined rotational speed values;
   connecting the power points between the measured rotational speeds with an interpolation method; and
   storing the power curve so determined as a function of at least one of the rotational speed and the measured values.

11. The method according to claim 10, which further comprises carrying out the power point connecting step by connecting the power points between the measured rotational speeds with a linear interpolation method.

12. The method according to claim 1, which further comprises:
   providing a test bench set up for power testing; and
   testing the test specimen in the test bench.

13. The method according to claim 12, which further comprises placing the test specimen in a test position in the test bench where the power testing is to be carried out.

14. The method according to claim 13, which further comprises permanently connecting the test specimen to the test bench in the test position.

15. The method according to claim 13, which further comprises removably fixedly connecting the test specimen to the test bench in the test position.

16. The method according to claim 13, which further comprises:
   providing a starter for starting the test specimen; and
   coupling the starter to the output shaft of the test specimen with a coupling device.

17. The method according to claim 13, which further comprises:
  providing a starter for starting the test specimen; and
  coupling the starter to the output shaft of the test specimen by interposing a measuring and coupling device.

18. The method according to claim 12, which further comprises connecting a fuel supply device to the test specimen.

19. The method according to claim 12, which further comprises:
  providing the test specimen with a control system; and
  connecting control and data lines for actuating the test specimen to the control system.

20. The method according to claim 12, which further comprises:
  providing the test specimen with an exhaust gas system;
  connecting an exhaust gas discharge line device to the exhaust gas system of the test specimen; and
  carrying away any exhaust gases produced during a test from a region of the test bench with the exhaust gas discharge line device.

21. The method according to claim 10, which further comprises picking up measured values with an evaluation device.

22. The method according to claim 21, which further comprises graphically representing the measured values and making the measured values available for further data processing.

23. The method according to claim 1, which further comprises at least one of controlling and regulating a test sequence of the test specimen with a control device.

24. The method according to claim 1, wherein the test specimen is an internal combustion engine.

* * * * *